May 15, 1962 A. BOILARD 3,034,556
ANTI-SKID CHAINS
Filed May 5, 1961
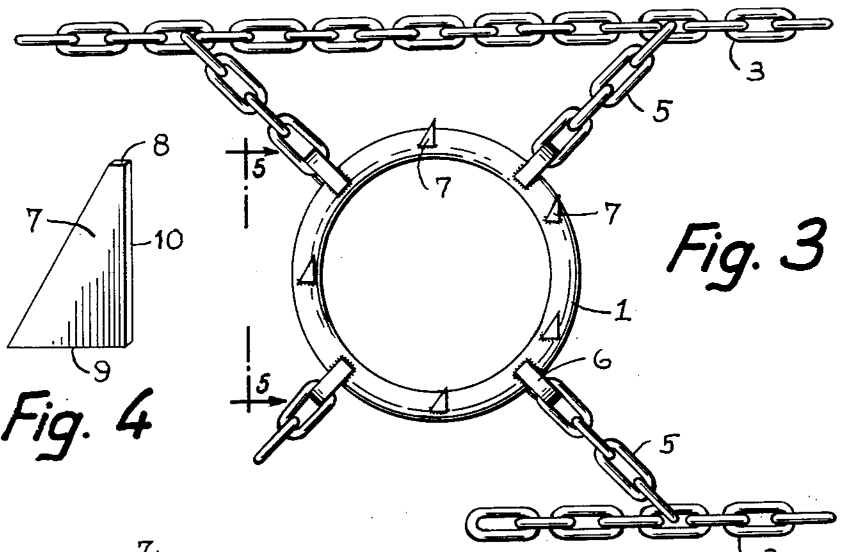
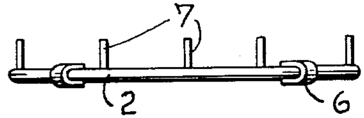
Fig. 6
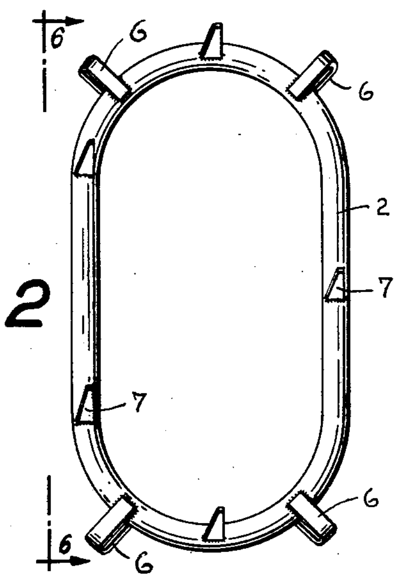
Fig. 2
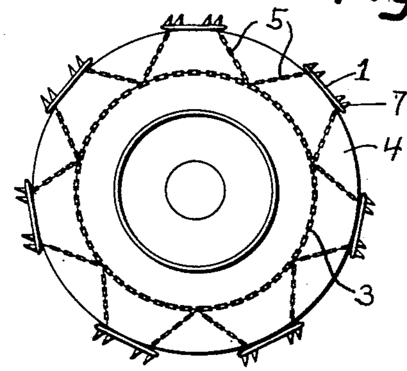
Fig. 1
INVENTOR
Alphonse BOILARD
By Pierre Lespérance
Agent United States Patent Office 3,034,556

Patented May 15, 1962

3,034,556

ANTI-SKID CHAINS

Alphonse Boilard, 262 3rd Ave. N., St. George, Quebec, Canada

Filed May 5, 1961, Ser. No. 108,093
2 Claims. (Cl. 152—229)

The present invention relates to an accessory for use in connection with motor vehicles, and more particularly to anti-skid chains of improved construction, and having increased traction power.

Several types of anti-skid chains are on the market, but they all have the disadvantage that their traction power decreases rapidly with wear, because the portions of said chains adapted to contact the ice surface and which have a pointed tip and a small contact surface when new, are subject with wear to a rapid increase of said contact surface and therefore the adherence to the ice decreases rapidly.

The general object of the present invention resides therefore in the provision of anti-skid chains which are especially made for travelling on ice, and which have a great traction efficiency which remains substantially constant even after prolonged use.

A more specific object of the present invention resides in the provision of anti-skid chains of the character described in which the claws or gripping members have a new and improved shape which provides a minimum contact surface with the ice, even after prolonged use and wear, whereby said gripping members penetrate at least slightly within the ice under the weight of the vehicle, and positively prevent skidding of the wheel on ice.

Another object of the present invention resides in the provision of anti-skid chains of the character described having a long service life and in which the traction members are solidly fixed to the chains themselves.

Still another object of the present invention resides in the provisison of traction members interconnected by chains and arranged in such a manner that only the traction members come in contact with the ground whereby the chains themselves are not subjected to wear by friction.

The foregoing and other important objects of the present invention will become more apparent during the following disclosure and by referring to the drawings, in which:

FIGURE 1 is a side elevation of a motor vehicle tire wheel provided with the anti-skid chains of the invention;

FIGURE 2 is a top plan view and also in partial perspective of a first embodiment of one of the traction members of the invention;

FIGURE 3 is a top plan view and in partial perspective of a second embodiment;

FIGURE 4 is a perspective view of one gripping member;

FIGURE 5 is a side elevation taken along line 5—5 of FIGURE 3; and

FIGURE 6 is a side elevation taken along line 6—6 of FIGURE 2.

Referring now more particularly to the drawings, in which like reference characters indicate like elements throughout, the traction members in accordance with the invention consist of ring-like members formed of a solid metal rod of circular cross-section; for small tires, such as passenger vehicle tires, the traction members have an annular shape, as indicated at 1 in FIGURE 3, whereas, for bigger tires such as those used on farm tractors and the like, the traction members have an oval form as shown at 2 in FIGURE 2. The oval traction elements 2 are transversely disposed with respect to the tire and can cover the entire width of said tire, and because they have a greater length than width, they can be disposed close to one another on the peripheral surface of the tire, in order to obtain better traction.

Traction members 1 or 2 are retained on the tread of the tire by being connected to lateral chains 3 which are concentrically disposed with respect to the tire 4 and on each side of said tire 4 by means of chain lengths 5 diagonally disposed and interconnected to the traction members 1 or 2 by means of half chain links 6 the legs of which are rigidly secured by welding in overlying relationship to the outer and inner faces of the traction member in a position at about 45° with respect to the plane of the wheel and in a plane at right angles to the plane of the traction member so that the next link of the chain length 5 will lie flat on the tire and will not normally contact the ground and consequently will not be subjected to wear.

The essential characteristic of the present invention consists in the provision of the gripping members 7 secured to the traction rings 1 or 2. FIGURE 4 shows a perspective view of one such gripping member 7 which consists of a relatively thin plate of hard steel having a high carbon content and cut to form a right triangle, the outer end of which is blunt as shown at 8. The base 9 of the gripping member 7 is rigidly secured to the traction ring 1 or 2 by welding and said gripping members are disposed in parallel planes which are also parallel to the plane of the wheel, with the right angularly disposed straight side 10 of the triangular gripping member constituting the leading edge with respect to the direction of rotation of the wheel.

The gripping members 7 are spaced along the traction rings 1 or 2 and are preferably disposed in staggered relationship such that they will engage the ground at laterally spaced points. When in use, it is obvious that the gripping member 7 will penetrate the ice under the weight of the vehicle due to the small bearing or contact surface of said members and which is constituted by the flattened end 8. Moreover, because the gripping members have a uniform thickness, their bearing surface will only increase very slightly with wear, and thus, even when worn to a considerable degree, will still penetrate the ice and afford very good traction. This traction is increased due to the fact that the leading edge 10 of the gripping member 7 is at right angles to the tangent to the portion of the tire in contact with the ground whereby there is no force component tending to cause removal of the gripping member from the ice as often occurs when the gripping members have inclined edges at the leading part thereof.

The anti-skid chains in accordance with the invention are secured on the tire in any conventional manner by uniting the ends of the lateral chains 3 by detachable locking devices.

While preferred embodiments in accordance with the invention have been illustrated and described, it is understood that various modifications may be resorted to without departing from the spirit and scope of the appended claims.

What I claim is:

1. In anti-skid chains, traction rings consisting of annular members adapted to be retained in contact with the tread of a pneumatic tire, and spaced gripping members rigidly secured to said rings, and protruding with respect to the tire tread, each gripping member being constituted by a relatively thin metal plate of uniform thickness and of right trianguler shape defining a base, an outer tip, a right angular side edge and an inclined side edge, said base being secured to the ring and said right angular side edge forming the leading portion of the gripping member with respect to the direction of rotation of the tire, said gripping members lying in planes parallel to the main rotational plane of the tire and disposed in staggered relationship so as to engage the ground at laterally spaced points with respect to the tire.

2. In anti-skid chains as claimed in claim 1, wherein said traction rings are retained on the tire tread by concentric chains disposed on the sides of the tire and by chain lengths uniting said concentric chains to said traction rings by means of links rigidly secured to said traction rings by means of links rigidly secured to said traction rings in overlying relationship and at about 45° with respect to the plane of said tire and disposed in a plane at right angles to the plane of said traction rings whereby the next link of the chain length will lie flat on the tire.

References Cited in the file of this patent

UNITED STATES PATENTS

| | | |
|---|---|---|
| 1,141,735 | Weed | June 1, 1915 |
| 1,438,148 | Vescovi | Dec. 5, 1922 |
| 1,905,441 | Cooper et al. | Apr. 25, 1933 |
| 2,545,887 | Langenfeld | Mar. 20, 1951 |